Nov. 12, 1940.   H. LORENZ   2,221,596

METHOD OF MANUFACTURING DRY RECTIFIERS

Filed Aug. 12, 1938

WITNESSES:
C. J. Weller.
R. W. Bailey

INVENTOR
Hermann Lorenz.
BY
F. W. Lyle.
ATTORNEY

Patented Nov. 12, 1940

2,221,596

UNITED STATES PATENT OFFICE

2,221,596

METHOD OF MANUFACTURING DRY RECTIFIERS

Hermann Lorenz, Berlin-Siemensstadt, Germany, assignor to Fides Gesellschaft fur die Verwaltung und verwertung von gewerblichen mit beschrankter Haftung, Berlin, Germany, a corporation of Germany Application August 12, 1938, Serial No. 224,575
In Germany January 22, 1938

2 Claims. (Cl. 175—366)

This invention relates to contact rectifiers and especially to the selenium type of contact rectifiers.

An object of the invention is to provide a rectifier capable of withstanding high voltages in the reverse direction.

Another object of the invention is a method of assembling the selenium rectifier whereby the layer of selenium therein may be formed accurately as to the desired thickness.

Figure 1:
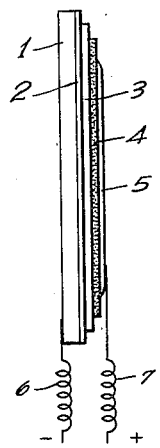
Figure 2:
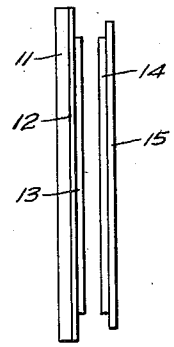

Other objects and advantages of the invention will be apparent from the following description and drawing in which:

Figure 1 is a side elevation view of a preferred embodiment of the invention, and Fig. 2 is a side elevation view of two portions of the selenium rectifier prior to these parts being united.

In Fig. 1 is illustrated a selenium contact rectifier in which the thickness of the various layers is very much enlarged for the purpose of clarity. On the aluminum plate 1 which consists of very pure aluminum a layer 2 of aluminum oxide is formed electrolytically by using dilute sulphuric acid as an electrolyte. On this oxide layer 2 a selenium layer 3 is fused and is then made conductive by heat treatment. On the selenium layer 3 a leakage electrode is then deposited. It is desirable that a blocking layer shall not be created on this side of the selenium and accordingly it is preferable to deposit a graphite layer 4 on the selenium layer and then to preferably spray a metallic lead electrode layer 5 thereover. In place of spraying the lead may be compressed or otherwise placed thereon. If the aluminum plate 1 is connected with the lead wire 6, then the illustrated rectifier element permits a positive current to flow from the lead wire 7 to the layers 5, 4, 3, 2, 1 to the lead wire 6, while in the opposite direction the current is blocked or at least limited to a small residual value.

The aluminum layer 1, before the formation of the oxide layer 2, should be roughened as, for example, by a sand blast or by chemical etching. The roughened layer 2 is oxidized and the fused selenium layer 3 will be held more firmly and more reliably than on a smooth base surface. The roughening also increases the contact area of the surface and accordingly also increases the conductivity of the contact surfaces.

In Fig. 2 is illustrated a simple process of assembling a contact rectifier and one in which the thickness of the selenium layer can be accurately predetermined. A thin selenium layer 13 is fused on the oxide layer 12 of the aluminum plate 11 and another thin layer of selenium 14 is fused on the leakage electrode 15. This electrode 15 may consist preferably of iron, nickel, cobalt or a nickel plated iron disk or plate, and two selenium layers 13 and 14 are then placed in contact with one another and an increased temperature applied thereto. By properly dimensioned temperature the superfluous selenium may be pressed out while the selenium layers are being fused so that the resulting unitary selenium layer is accurately the desired thickness. After hardening, the selenium layer is converted into the conducting form by heat treatment. This type of assembly has the advantage that the thickness of the selenium, as well as its other properties, may be far better determined than in other methods of construction.

The formation of the aluminum oxide layer on the aluminum is preferably performed electrolytically, for example, after the well known eloxal method. The rectifier cells are suitable for standing comparatively high reverse potential up to 30 volts, particularly if before the deposit of selenium the aluminum oxide layer is treated in a suitable bath for the purpose of closing the pores.

In lieu of aluminum oxide, oxides of magnesium, tantalum, cerium, niobium, iron or a heavy metal may be used. In general, those insulating compounds (particularly oxides, sulphides, silicates) are suitable which may be produced in the finest cohesive and well adhesive layers on the metal surfaces. Preferably that metal is used as an electrode, the compound of which is to be utilized as a blocking layer since, in such a case, the reverse blocking layer may be formed directly on the electrode. However, for the purpose of producing the blocking layer, the metallic component may be deposited on any kind of a metal electrode, for example, by vaporizing in a vacuum, galvanically by cathodic sputtering, or in accordance with any other known method. The thin metal layer so produced is then converted into the non-conducting compound which is to be used as a blocking layer chemically. This method is advantageous on the basis of economy when the compounds of expensive metals, as, for example, such as tantalum, are to be used as blocking layer. As semi-conductors, sulphur, tellurium, their mixtures or good conducting compounds of these materials may, for example, be used in lieu of selenium.

The invention also contemplates increasing the comparatively high reverse blocking potential of 30 volts up to 75 volts per cell by using for the metallic conductor electrode 1 of Fig. 1, or 11 of Fig. 2, aluminum metal with a degree of purity of 99.5% and preferably 99.6 to 99.99%. Also, in forming the metal oxide layer thereon an electrolyte of dilute sulphuric acid is utilized. In using direct current with approximately 15 volts bath potential, the sulphuric acid of the electrolyte is preferably of the order of 15% by volume and the treatment 30 minutes. In the use of alternating current with approximately 30 volts bath potential the sulphuric acid concentration is approximately 4% by weight and the time of treatment is preferably also of the order of 30 minutes. Occasionally it may be of advantage to utilize a somewhat higher sulphuric acid concentration. It is believed that the very high blocking potential of 75 volts is preferably due to the extremely small copper content of the aluminum oxide layer produced electrolytically on the very pure aluminum by uing dilute sulphuric acid. The copper content may be easily reduced to magnitudes of approximately .001% in using the method according to the invention.

Similar suitable results are attained if the aluminum is partially or wholly replaced by magnesium. Magnesium is as is known impurified only to a small extent by copper. Since, however, magnesium is soluble in sulphuric acid, alkali electrodes must be used in this case which may be composed in the same manner as is usual for the carrying out of the well known electrolytic oxidation methods for magnesium.

While there has been described certain preferred embodiments and methods in connection with the invention, it is apparent that many modifications may be made without departing from the spirit of the invention. Accordingly, only such limitations are intended on the following claims as are necessitated by the prior art.

I claim as my invention:

1. The method of forming a selenium rectifier which comprises placing a layer of selenium on an electrode surfaced with an insulating compound of a metal selected from the group consisting of aluminum, magnesium, tantalum, cerium, niobium and iron, placing another layer of selenium on another electrode having a surface selected from the group consisting of graphite, lead, iron, nickel, cobalt and joining the two layers of selenium together with the application of heat.

2. The method of forming a selenium rectifier which comprises placing a layer of selenium on an electrode surfaced with an insulating compound of a metal selected from the group consisting of aluminum, magnesium, tantalum, cerium, niobium and iron, placing another layer of selenium on another electrode having a surface selected from the group consisting of graphite, lead, iron, nickel, cobalt and joining the two layers of selenium together with the application of heat, and compressing said layers of selenium to the desired thickness.

HERMANN LORENZ.